United States Patent
Chou et al.

(10) Patent No.: US 6,231,095 B1
(45) Date of Patent: May 15, 2001

(54) ENERGY ABSORPTION IMPACT SYSTEM

(75) Inventors: Shui Fang Chou, Troy; Todd W. J. Tjoelker; Alessandro Libriani, both of Grand Rapids, all of MI (US)

(73) Assignees: Benteler Automotive Corporation, Grand Rapids; Ford Motor Company, Dearborn, both of MI (US)

(*) Notice: Subject to any disclaimer, the term of this patent is extended or adjusted under 35 U.S.C. 154(b) by 0 days.

(21) Appl. No.: 09/472,718

(22) Filed: Dec. 23, 1999

(51) Int. Cl.$^7$ ............................................. B60R 19/34
(52) U.S. Cl. ........................ 293/133; 188/371; 188/376; 188/377
(58) Field of Search ........................ 293/133; 188/371, 188/376, 377

(56) References Cited

U.S. PATENT DOCUMENTS

| | | | |
|---|---|---|---|
| 3,412,628 | * 11/1968 | Gain | 74/492 |
| 3,779,591 | 12/1973 | Rands . | |
| 3,782,769 | 1/1974 | Fader et al. . | |
| 4,190,276 | 2/1980 | Hirano et al. . | |
| 4,272,114 | 6/1981 | Hirano et al. . | |
| 4,411,167 | 10/1983 | Mohr . | |
| 4,545,236 | * 10/1985 | Turczyn | 188/377 |
| 4,702,515 | * 10/1987 | Kato et al. | 293/133 |
| 4,829,979 | * 5/1989 | Moir | 293/133 |
| 4,976,481 | * 12/1990 | Yoshihira | 293/133 |
| 5,085,467 | 2/1992 | Converse . | |
| 5,096,223 | 3/1992 | Tekely et al. . | |
| 5,116,092 | * 5/1992 | Schonleber | 293/133 |
| 5,224,574 | * 7/1993 | Thum | 188/377 |
| 5,314,229 | * 5/1994 | Matuzawa et al. | 293/133 |
| 5,403,049 | 4/1995 | Ebbinghaus . | |
| 5,419,416 | * 5/1995 | Miyashita et al. | 188/371 |
| 5,427,214 | 6/1995 | Prottengeier et al. . | |
| 5,431,445 | * 7/1995 | Wheatley | 188/377 |
| 5,542,365 | * 8/1996 | Jurisich et al. | 188/377 |
| 5,566,777 | 10/1996 | Trommer et al. . | |
| 5,597,055 | * 1/1997 | Han et al. | 188/371 |
| 5,609,063 | 3/1997 | Hedderly et al. . | |
| 5,669,633 | * 9/1997 | Naff et al. | 188/376 |
| 5,732,801 | * 3/1998 | Gertz | 188/371 |
| 5,820,163 | 10/1998 | Thacker et al. . | |
| 5,876,078 | * 3/1999 | Miskech et al. | 293/133 |
| 6,062,355 | * 5/2000 | Nohr et al. | 188/371 |
| 6,068,329 | * 5/2000 | Miller | 188/377 |
| 6,106,039 | * 8/2000 | Maki | 293/133 |

* cited by examiner

Primary Examiner—Joseph D. Pape
Assistant Examiner—Kiran Patel
(74) Attorney, Agent, or Firm—Price, Heneveld, Cooper, DeWitt & Litton

(57) ABSTRACT

A channeled energy absorption unit for a vehicle bumper impact system to absorb impact energy and forestall or minimize damage to vehicle frame rails under impact. The basic embodiment is a tube with one end flared and welded at a hole in one end plate or directly to the vehicle frame rail. When loaded axially, the tube splits, peels and is inverted to absorb impact in a generally square wave energy absorption. Preferred channels in the tube stabilize the failure mode during this process to assure a predetermined energy absorption characteristic.

34 Claims, 5 Drawing Sheets

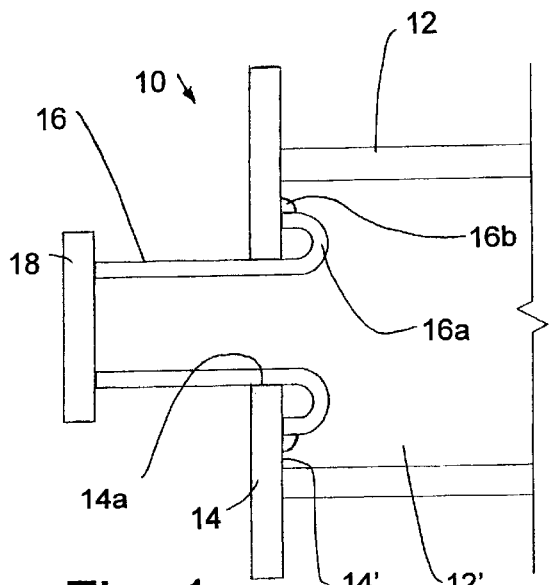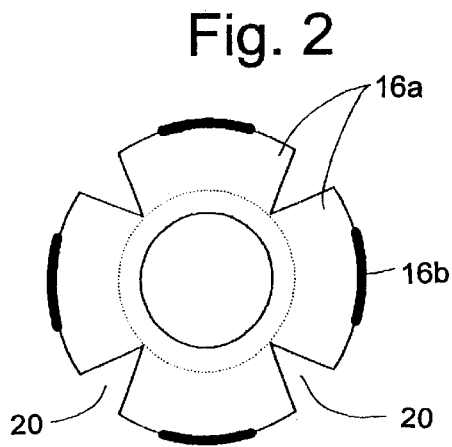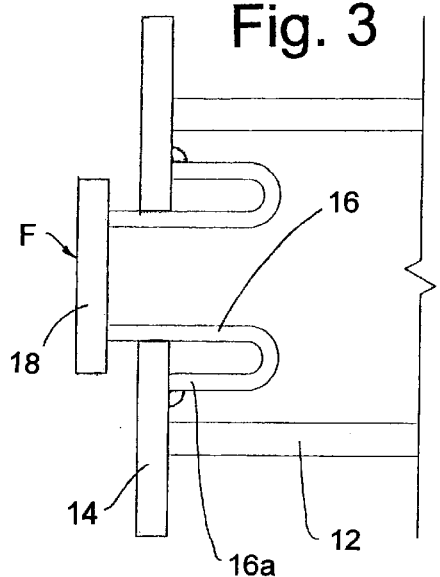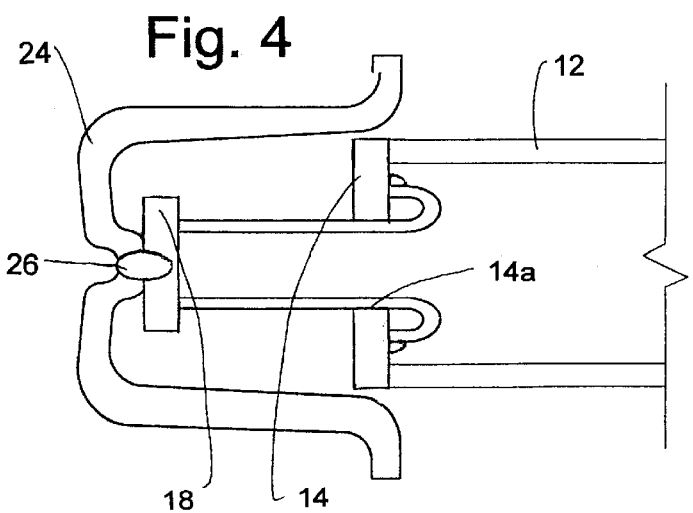

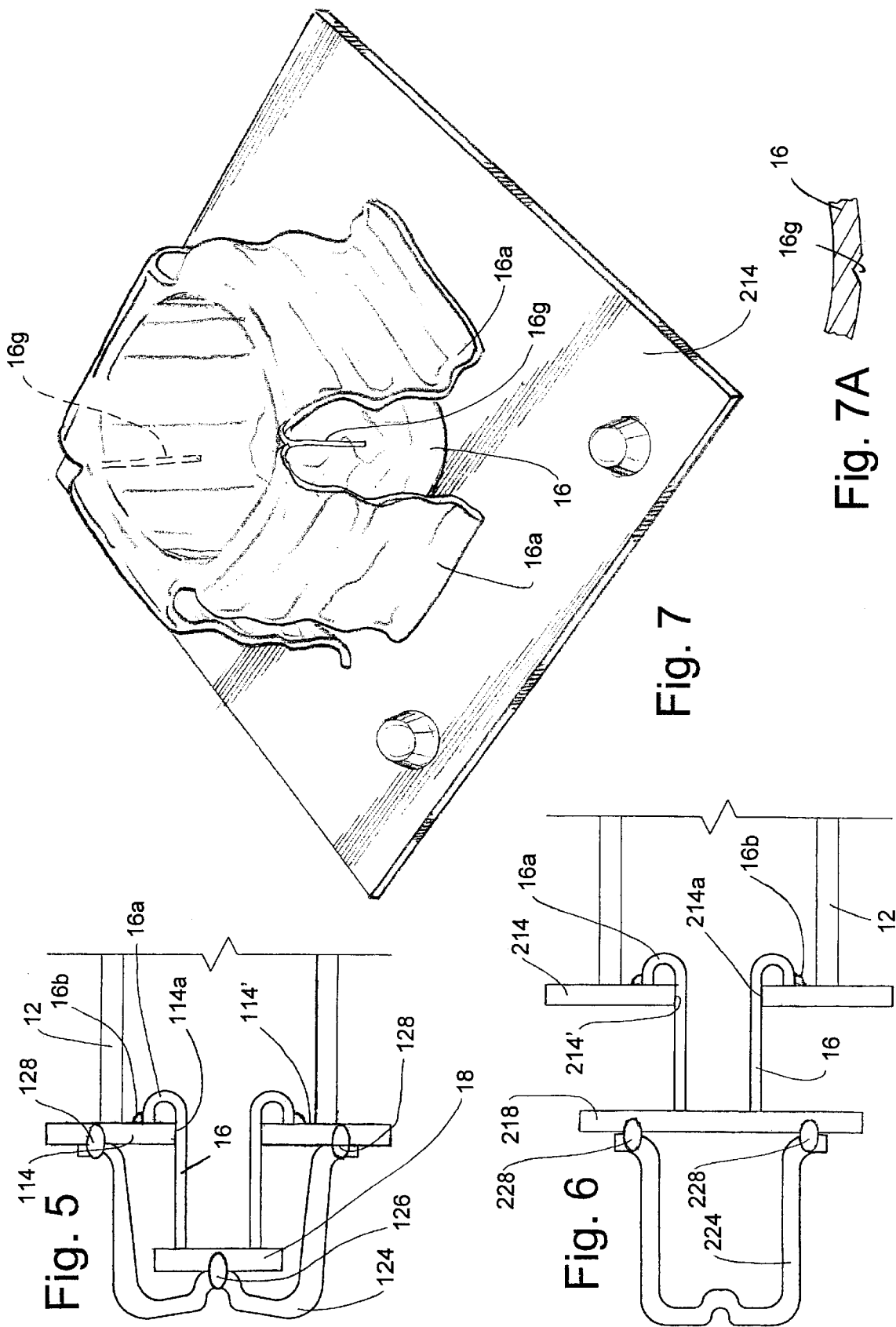

ENERGY ABSORPTION IMPACT SYSTEM

BACKGROUND OF THE INVENTION

This invention relates to an impact absorption apparatus and especially to an energy absorption device for a vehicle bumper impact system.

It is typical for an automotive bumper system to include three key components. The first is a decorative fascia, usually of plastic, mounted on the exterior of the front end module. The second is a rigid impact beam, typically constructed of roll formed or stamped steel. And the third is an energy absorption device connecting the impact beam to the vehicle frame rails. These three components are designed together to meet the performance requirements for low and high speed impacts.

It is beneficial to design the bumper system in such a way that limited damage is transferred to the vehicle frame rails under impact by properly engineering the energy absorption device. One guideline provided for this design process is for the bumper system to have a peak loading capability equivalent to 85% of the combined rail capacity. This assures that the energy absorption unit will crush first upon impact before loading is imparted on the rails. It is also beneficial to design the bumper system to provide this energy absorption in a controlled and repeatable manner. This allows for consistency in vehicle crash behavior.

There is substantial prior art regarding energy absorption units and bumper systems including U.S. Pat. Nos. 5,427, 214; 5,732,801; and 4,272,114. These disclosures depict various methods of meeting the energy absorption targets for the bumper system. Shortcomings of these designs include inconsistency in deformation and resultant energy absorption, instability in lateral loading, high associated manufacturing costs, and post impact damage visibility.

SUMMARY OF THE INVENTION

It is an object of this invention to provide a vehicle energy absorption unit which achieves a controlled and consistent energy absorption characteristic in a bumper impact system.

A cylindrical tube, preferably of steel or aluminum metal, and preferably round in cross section, is preferably grooved, i.e., scored, to provide channels in multiple locations around its periphery to a controlled depth of the tube thickness, but extending lengthwise, i.e., axially of the tube. These channels or grooves can significantly influence the deformation and energy absorption characteristics, to achieve a predetermined load deflection curve. Deformation control is further achieved by the depth of the channels, their locations and quantity, the material of the tube and the thickness of the tube. The tube is partially slit or notched, and flared, preferably along these grooves, at one end of the tube, to form extending mounting flanges, i.e., flange segments. The tube is placed at an opening in an inner reinforcement plate which is of substantially rigid material, usually steel, or alternatively at the forward end of the vehicle frame rail, and the flared end flanges are welded to this plate or frame rail. The opposite outer end of the tube is welded to a secondary outer plate of substantially rigid material such as steel, or directly to the rigid impact beam. If the inner plate is used, it is fastened to the forward end of a hollow vehicle frame rail, with the tube and outer plate being outward of the frame rail. The tube is axially aligned with the hollow interior of the vehicle frame rail. Two of these energy absorption units, i.e., crush boxes, are to be used as portions of a vehicle bumper assembly, usually a front bumper assembly, and are secured as by welding or mechanical attachment to the rigid bumper impact beam, on opposite sides of the vehicle, so as to be in alignment with the two frame rails.

When an impact force is applied to the impact beam, the load is transferred to the outer plates of the two energy absorption units. The tubes are compressed by the load, causing each of them to have portions progressively radially outwardly deflecting and tearing from the cylinder and inverting so the tube passes axially through the inner plate opening. The tube inverts, i.e., turns inside out, through this deflection and tearing process, being contained within the hollow body of the frame rail. The grooved channels in the tube cause the tube to split and tear in a controlled manner along these channels during deformation. The resultant deformation can create a load deflection curve with generally square wave characteristics to allow a controlled peak load near 85% of the rail capacity. This resultant generally square load curve, and the controlled failure mechanism that causes it, are believed particularly unique in the industry.

BRIEF DESCRIPTION OF THE DRAWINGS

FIG. 1 is a sectional diagrammatic view of portions of one embodiment of the novel impact unit on a vehicle frame rail;

FIG. 2 is an end elevational view of the impact unit in FIG. 1, viewing it toward the inner end of the impact cylinder;

FIG. 3 is a sectional view showing the deformed, impact absorbing element in FIGS. 1 and 2 after impact;

FIG. 4 is a sectional side elevational view of a first embodiment bumper assembly employing the invention of FIGS. 1 and 2;

FIG. 5 is a sectional, side elevational view of a second embodiment bumper assembly employing the invention of FIGS. 1 and 2;

FIG. 6 is a sectional, side elevational view of a third embodiment impact bumper assembly employing the invention of FIGS. 1 and 2;

FIG. 7 is a perspective view of a deformed impact unit of FIGS. 1 and 2 as actually tested;

FIG. 7A is a fragmentary, enlarged, sectional view of the cylinder wall and one grooved channel;

DESCRIPTION OF THE PREFERRED EMBODIMENT

Figure 8:
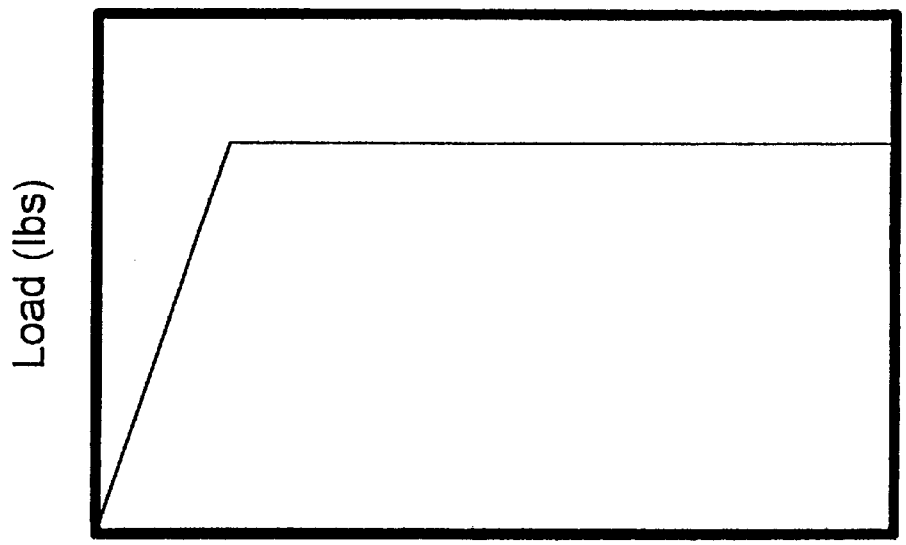
FIG. 8 is a diagram showing a theoretical load curve having a desired square wave configuration.

Referring now specifically to the drawings, FIG. 1 shows a novel impact absorbing unit 10 mounted on a vehicle frame rail 12. The impact unit is shown to include an inner rigid plate 14, a cylindrical deformable tube 16, and an outer rigid plate 18. The inner end of tube 16 is segmented by slitting or notching at several spaced intervals around the tube circumference into a plurality of flanges 16a shown in FIG. 2 to be four in number and separated by circumference notches 20. These flanges 16a are shown to be flared radially outwardly to form mounting weld flanges secured by weld joints 16b to the inner face 14' of inner plate 14, i.e., the face opposite the tube 16, and around the perimeter of opening 14', as shown in FIG. 1. Plate 14 has an opening 14a of a size to receive crush cylinder 16. Inner plate 14 can be secured to the forward open end of the frame rail 12 as by welding. Flanges 16a may be formed into an arcuate configuration as depicted in FIG. 1, even extending back about 180° as shown, or may simply be flat, i.e., extending radially outwardly generally normal to the outer peripheral wall of cylinder 16. Variations are depicted and explained hereafter relative to other drawing figures. Cylinder 16 is preferably a right cylinder having a circular cross sectional configuration although polygonal cross sections can be employed. At the outer axial end of cylinder 16 is preferably positioned an outer rigid plate member 18 which may be attached to cylinder 16 by welding.

One of these crush units as depicted is preferably located on each of the two laterally spaced, fore-to-aft frame rails of the vehicle, these frame rails being conventionally located toward opposite sides of the vehicle. These frame rails extend longitudinally of the vehicle and have a hollow interior 12' larger in diameter, i.e., transverse dimensions, than cylinder 16.

In FIGS. 4, 5 and 6 are depicted three possible alternative embodiments of the relationship between the rigid transverse rolled or stamped bumper member 24 and the impact crush members of FIGS. 1 and 2. The crush units are attached to the frame rails 12 as previously noted. In FIG. 4, the vertical center of bumper 24 is shown secured by weldment 26 to outer plate 18, with the upper and lower extremities of bumper 24 straddling the upper and lower edges, respectively, of inner plate 14, thereby aesthetically enclosing the crush units. In FIG. 5, bumper 124 is not only welded at its vertical center by weldment 126 to outer plate 18, but is also welded to plate 114 at 128 at the upper and lower extremities of bumper 124. Plate 114 has a greater vertical height than plate 14 in FIG. 4. Also, the weld flanges 16a of the inner end of crush cylinder 16 are welded by weld joints 16b to the inner face 114' of inner plate 114. Opening 114a in plate 114 is of a size to receive cylinder 16, as previously noted relative to FIG. 4.

In the third embodiment in FIG. 6, bumper 224 is welded at its extremities by weldments 228 to the outer face of outer plate 218 which has a vertical dimension greater than plate 18 in FIG. 4. Again, the inner face of outer plate 218 is attached to the outer axial end of crush cylinder 16, while the inner weld flanges 16a of cylinder 16 are welded at 16b to the inner face of inner plate 214. Cylinder 16 extends through opening 214' in plate 214. Plate 214 is attached to the front open end of frame rail 12.

Conceivably, the outer end of crush tube 16 could be attached directly to the bumper beam member without outer plate member 18. I.e., the outer impact receiving member can be considered as the outer plate, or as the combination outer plate and bumper, or as the bumper.

Upon impact of a force against bumper 24, 124, or 224, the impact will be applied in the embodiments in FIGS. 4 and 6 entirely against the inner plate 18 and 218 and from thence to the crush cylinder 16. Cylinder 16 is thus forced inwardly through the orifice 14a (FIG. 4), or 214a (FIG. 6), causing the cylinder 16 to progressively peel into segments and become inverted as shown in FIGS. 3 and 7. In the FIG. 5 embodiment, the impact force is partially applied to crush cylinder 16, and partially applied to plate 114 and thence directly to frame rail 12.

In the preferred form of the crush tube, the tube is axially scored at a plurality of peripheral locations, preferably on its outer periphery, e.g., four locations in the tube depicted in FIG. 7, to form axially elongated, channeled grooves 16g. These channels or grooves are preferably of triangular or square cross section (FIG. 7A). They have been found to assure a desirable flattening of the force curve to result in a relatively constant load resistance following the initial rapid ramp up of the load resistance curve, rather than a steadily increasing load resistance, since these control grooves serve as crack initiators in the tube. The number of the grooves can vary, although four grooves were found to be satisfactory, resulting in four weld flanges separated as by V-shaped notches. In other words, the channels are aligned with and extend axially along the tube from these notches, causing the tube to split and "peel" uniformly as it becomes inverted by being forced axially through the opening 14a, 114a, or 214a in the inner rigid plate 14, 114, or 214, respectively, into the hollow frame rail.

Figure 8A:
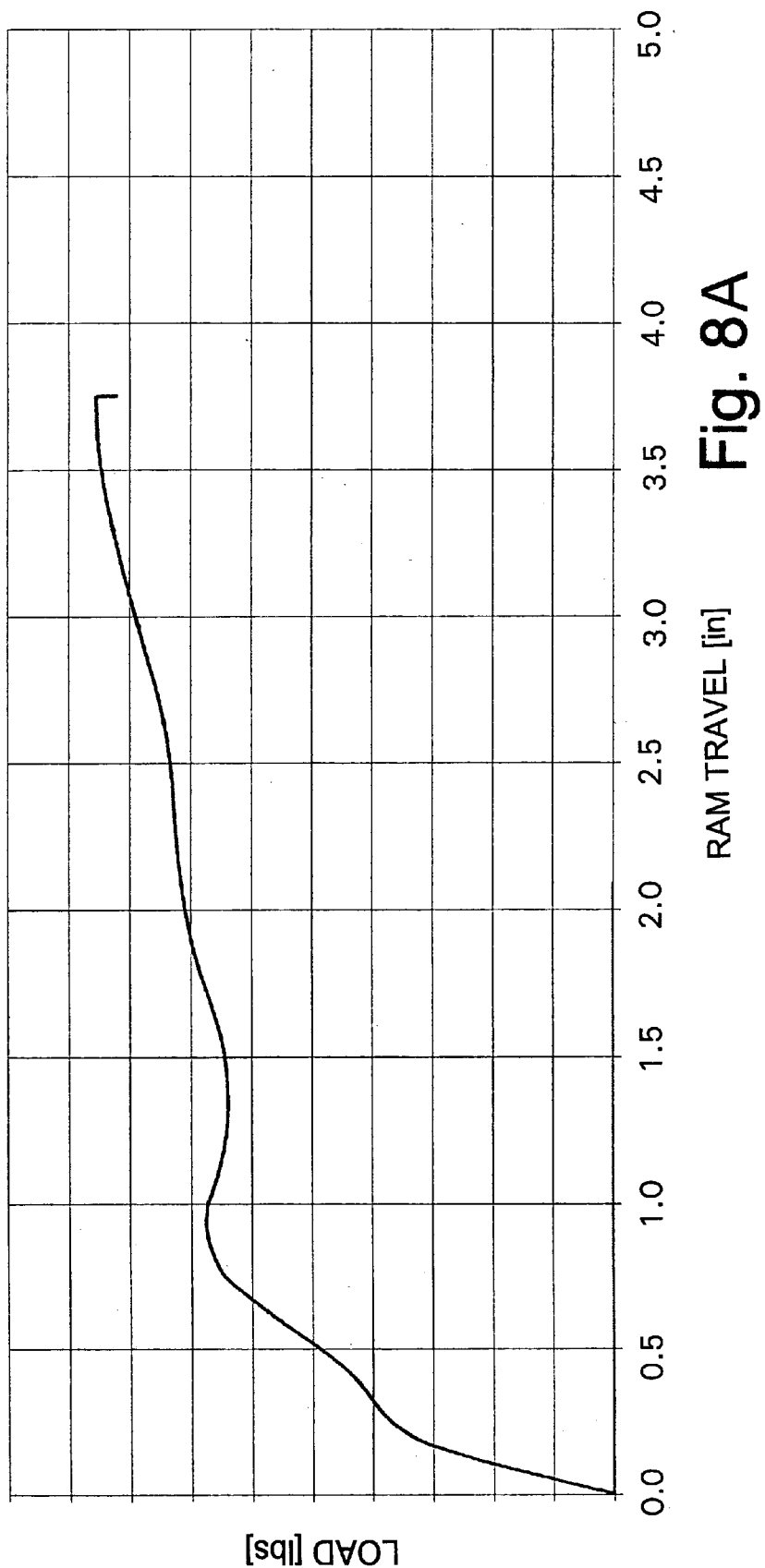
FIG. 8A is a diagram showing the impact absorption results of an experimental impact unit.

As previously noted, the desired load curve is a substantially square wave load curve as in FIG. 8. That is, the load versus deflection characteristics is represented by a square wave wherein the load response has a rapid ramp up to a predetermined load, followed by a generally constant load value for the duration of the deflection. In reality, the load curve is not this exact, but similar thereto. Specifically, representative test results from impact applied to FIG. 7 type versions of the novel system are shown in FIG. 8A. Specifically, in FIG. 8A, after the initial ramp up impact load, the resistance load of the impact cylinder to the impact force was generally level, i.e., a substantially square wave function. The impact curve can be controlled by the material of the crush box cylinder. e.g., a selected steel or aluminum, the hardness of the material, the diameter of the cylinder, the wall thickness of the cylinder, the depth of the score channels and the remaining thickness of the cylinder metal, the number of grooved score channels, and by the impact force being optionally partially applied to crush cylinder 16 and partially applied to plate 114 and thence directly to frame rail 12 as in FIG. 5.

Regarding selection of cylinder materials, if steel is used, it may be hardened as by induction hardening, as another parameter. Thus, material with a strength of from about 30 ksi to about 200 ksi can be employed. Wall thickness should preferably vary in the general range of between about 1.0 mm and about 5.0 mm. If a material of low strength is employed, the cylinder can tear without the need for tear grooves. As noted, the number of grooves can also be varied, with satisfactory tests having been made using zero, four, six and eight grooves. Test groove depths have ranged from about 10% to about 50% of the wall thickness. Optimally, the groove depth is limited to that which allows tearing consistency while maintaining maximum energy absorption in the remaining thickness. The presence of grooves of any depth has been shown to increase tearing consistency versus no grooves. The groove shape if preferably a V-shape.

Figures 9, 10A, 10B:
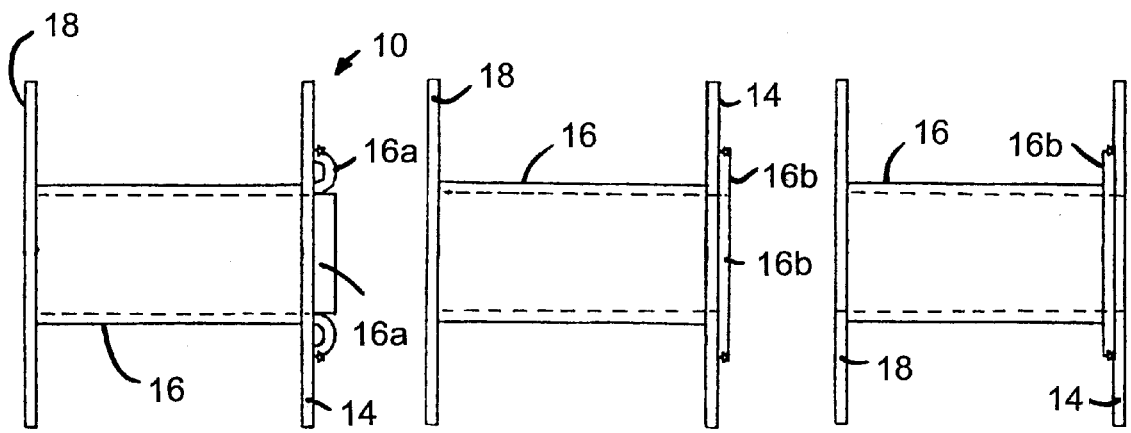
FIG. 9 is a generic diagrammatic side elevational view of the embodiments in FIGS. 1–6.
FIG. 10A is a diagrammatic side elevational view of the device with the flanges extending outwardly generally normal to the tube axis and peripheral wall, and on the wall face of the inner plate most adjacent to the tube body.
FIG. 10B is a diagrammatic, side elevational view of the device with the flanges extending outwardly generally normal to the tube axis and peripheral wall, and on the wall face of the inner plate opposite the tube body.
Figure 11:
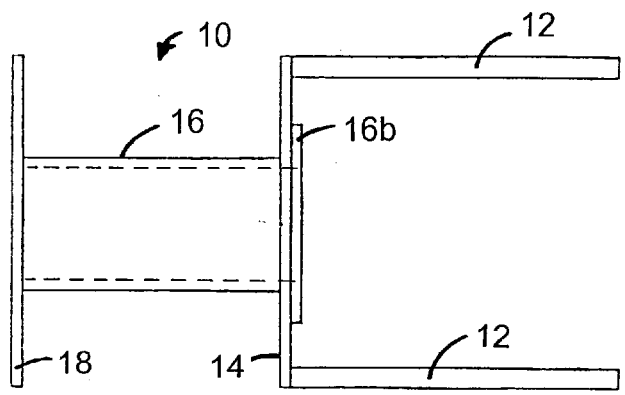
FIG. 11 is a side elevational view of an embodiment in which the tube flanges are welded to an inner plate.

The mounting flanges can be variously configured, and can be attached in various ways. In FIGS. 1–6, the flanges are shown attached to the inner plate, extending radially outwardly and reverse bent at about 180° to form a U-shaped configuration. This is also represented by FIG. 9. In FIG. 10B the flanges 16b are shown extending simply radially outwardly from the cylinder to be generally normal thereto, all flanges generally in the same plane, i.e., flat, and welded to the inner plate 14, on the inner plate face, i.e., the face on the opposite side of the inner plate as the crush cylinder 16. In FIG. 10C the flanges 16b are again shown flat, but welded to the inner plate 14 on its face which is on the same side as the crush cylinder 16. In FIG. 11, the structure is generally similar to that in FIG. 1 except that the flanges are flat, i.e., extending radially outwardly, generally normal to the crush cylinder 16, rather than in the U-shape as in FIG. 1.

Figure 12:
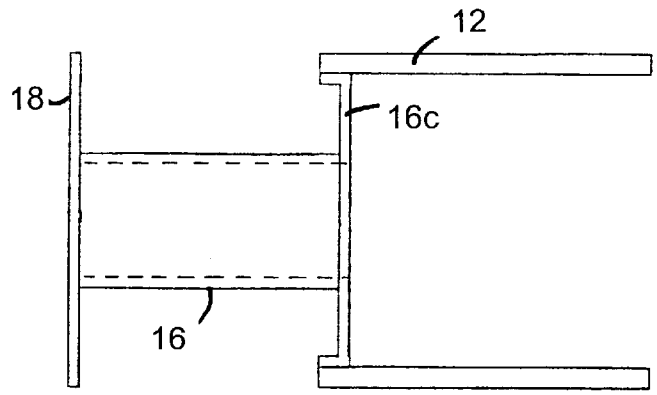
FIG. 12 is a side elevational diagrammatic view of a variation of the embodiment in FIG. 11 where the flanges are welded directly to the outer ends of the vehicle frame rail, using no inner plate.
Figure 13:
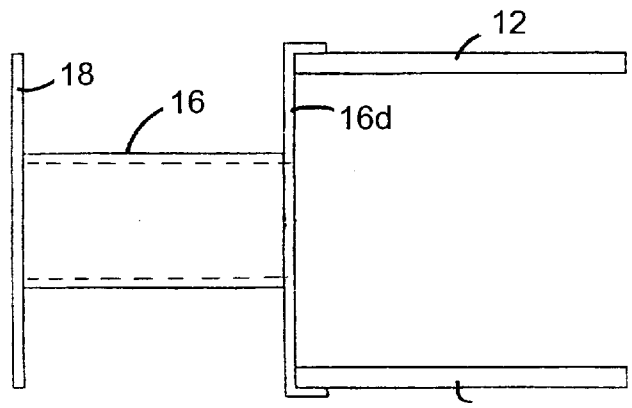
FIG. 13 is a side elevational diagrammatic view of another variation of the embodiment in FIG. 12.

In some instances it may be desirable to eliminate the inner reinforcing plate so that the crush cylinder is mounted directly to the vehicle frame rails. Thus, in FIGS. 12 and 13, the flanges 16c are shown attached directly to the outer ends of the frame rails. Specifically, in FIG. 12 the flanges 16c extend radially outwardly but then the outer ends of the flanges extend parallel to the crush cylinder axis, to lie against the frame rail 12 inside periphery where the flanges are welded to the frame rail. In FIG. 13 the flanges 16d extend radially outwardly and then the outer flange ends extend parallel to the crush cylinder axis to lie against the outside periphery of the frame rail 12, where the flanges are welded to this frame rail.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An energy absorption vehicle impact support comprising:
    a plate for mounting to a vehicle frame rail, and having an opening therethrough with a perimeter therearound;
    an impact-receiving member spaced from said plate;
    an invertable, tubular, energy absorption crush element between said plate and said member, said energy absorption element having two axial ends, one of said ends being secured at said member and the other said end having radially outwardly flared flange segments secured to said plate around said opening perimeter, whereby impact on said member toward said energy absorption element and said plate results in said energy absorption element being progressively split and peeled in segments and inverted through said opening.

2. The energy absorption vehicle impact support in claim 1 wherein said tubular energy absorption element is cylindrical.

3. The energy absorption vehicle impact support in claim 1 wherein said tubular element flared segments are curled radially outwardly.

4. The energy absorption vehicle impact support in claim 1 wherein said tubular element is of induction hardened steel.

5. The energy absorption vehicle impact support in claim 1 wherein said plate has an inner face oriented away from said member, and said flange segments are secured to said inner face.

6. The energy absorption vehicle impact support in claim 1 wherein said plate has an inner face oriented away from said member, and said flange segments are secured to said inner face by weldment.

7. The energy absorption vehicle impact support in claim 1 wherein said crush element has a plurality of notches between said flange segments, and a plurality of axially extending score channels aligned with said notches.

8. The energy absorption vehicle impact support in claim 7 wherein said channels are triangular in cross section.

9. The energy absorption vehicle impact support in claim 7 wherein said crush element has an outer periphery, and said score channels are in said outer periphery of said crush cylinder.

10. The energy absorption vehicle impact support in claim 4 wherein said tubular crush element has a strength in the range of about 30 ksi to about 200 ksi.

11. The energy absorption vehicle impact support in claim 4 wherein said tubular crush element has a wall thickness in the range of about 1 to 5 mm.

12. The energy absorption vehicle impact support in claim 7 wherein said tubular crush element has a wall thickness and said channels have a depth of about 10% to 50% of said wall thickness.

13. The channeled energy absorption vehicle impact support in claim 1 wherein said crush element is of aluminum, steel or induction hardened steel.

14. A channeled energy absorption vehicle impact support comprising:
    a plate for mounting to a vehicle frame rail, and having an opening therethrough with a perimeter therearound;
    an impact-receiving member spaced from said plate;
    an invertable, tubular, energy absorption element between said plate and the member, said energy absorption element having two axial ends, one of said ends being secured at said member and the other said end having radially outwardly flared segments secured to said plate around said opening perimeter;
    said plate having one face oriented toward said member and having an opposite second face oriented away from said member;
    said other end of said energy absorption element extending through said opening, with said outwardly flared segments being secured to said plate second face, whereby impact on said member toward said element and said plate results in said element being split and peeled in segments and inverted through said opening.

15. The channeled energy absorption vehicle impact support in claim 14 wherein said tubular element is cylindrical.

16. The channeled energy absorption vehicle impact support in claim 14 wherein said tubular element flared segments are curled radially outwardly.

17. The channeled energy absorption vehicle impact support in claim 15 wherein said tubular element has a circular cross section.

18. The channeled energy absorption vehicle impact support in claim 17 wherein said tubular element has notches between said outwardly flared segments and has axial grooves extending along said element from said notches.

19. The channeled energy absorption vehicle impact support in claim 14 wherein said tubular element is of induction hardened steel.

20. The channeled energy absorption vehicle impact support in claim 18 wherein said axial grooves are triangular in cross section.

21. The channeled energy absorption vehicle impact support in claim 18 wherein said axial grooves are equally spaced around the tubular element.

22. The channeled energy absorption vehicle impact support in claim 18 wherein said energy absorption element is of steel.

23. The channeled energy absorption vehicle impact support in claim 22 wherein said steel is induction hardened.

24. The channeled energy absorption vehicle impact support in claim 23 wherein said steel has a strength in the range of about 30 ksi to about 200 ksi.

25. The channeled energy absorption vehicle impact support in claim 23 wherein said energy absorption element has a wall thickness in the range of about 1 mm to about 5 mm.

26. The channeled energy absorption vehicle impact support in claim 18 wherein said grooves have a depth of about 10% to about 50% of the wall thickness of said tubular element.

27. A channeled energy absorption vehicle impact support comprising:

a plate for mounting to a vehicle frame rail, and having an opening therethrough with a perimeter therearound;

an impact-receiving member spaced from said plate;

an invertable, tubular, energy absorption crush element between said plate and said member, said energy absorption element having two axial ends, one of said ends secured at said member and the other of said ends having segments secured to said plate around said perimeter of said opening periphery with, said tubular energy absorption crush element having axial grooves extending from a location between said segments and said one end.

28. The channeled energy absorption vehicle impact support in claim 27 wherein said tubular energy absorption element has an inner periphery and an outer periphery, and said axial grooves are at least partially in said outer periphery.

29. The channeled energy absorption vehicle impact support in claim 27 wherein said tubular element is cylindrical.

30. The channeled energy absorption vehicle impact support in claim 29 wherein said tubular cylindrical crush element has a circular cross section.

31. The channeled energy absorption vehicle impact support in claim 27 wherein said tubular crush element segments are flared radially outwardly from said tubular crush element.

32. The channeled energy absorption vehicle impact support in claim 27 wherein said plate has an inner face oriented away from said member, and said segments are secured to said inner face.

33. The channeled energy absorption vehicle impact support in claim 32 wherein said plate has an inner face oriented away from said member, and said segments are secured to said inner face by weldment.

34. The channeled energy absorption vehicle impact support in claim 27 wherein said crush element is of aluminum, steel or induction hardened steel.

* * * * *

UNITED STATES PATENT AND TRADEMARK OFFICE
CERTIFICATE OF CORRECTION

PATENT NO. : 6,231,095 B1 Page 1 of 1
DATED : May 15, 2001
INVENTOR(S) : Shui Fang Chou et al.

It is certified that error appears in the above-identified patent and that said Letters Patent is hereby corrected as shown below:

<u>Column 4,</u>
Line 63, "if" should be -- is --.

<u>Column 7,</u>
Line 24, delete "periphery with".
Line 25, after "having", insert -- periphery with --.

Signed and Sealed this

Second Day of July, 2002

*Attest:*

JAMES E. ROGAN
*Attesting Officer* *Director of the United States Patent and Trademark Office*